UNITED STATES PATENT OFFICE.

HARRY CHISLET, OF SCHENECTADY, NEW YORK, ASSIGNOR TO GENERAL ELECTRIC COMPANY, A CORPORATION OF NEW YORK.

JAPAN.

1,357,688.     Specification of Letters Patent.     Patented Nov. 2, 1920.

No Drawing.     Application filed July 11, 1919. Serial No. 310,114.

*To all whom it may concern:*

Be it known that I, HARRY CHISLET, a citizen of the United States, residing at Schenectady, county of Schenectady, State of New York, have invented certain new and useful Improvements in Japans, of which the following is a specification.

This invention comprises an improvement in a non-inflammable japan consisting of an emulsion of japan-forming materials, such, for example, as asphaltic and oleaginous material in water, as described in Davey Patent 1,294,422, February 18, 1919, and which will hereinafter be referred to as water japan.

It is the object of my invention to improve the adhesion of water japan to metals and enables water japan to withstand higher temperatures without scumming.

In accordance with my invention, a non-oleaginous colloid is added to the emulsion constituting "water japan" to render the emulsion more permanent. For example, to a japan comprising an emulsion in an ammoniacal solution of japan base comprising asphaltic material and a drying oil is added a solution of gelatin, for example, glue of animal origin. For example, a solution of glue is prepared by treating one part of glue with four parts of water until a uniform solution is obtained. This glue solution preferably is added after the japan base has been emulsified but it may if desired be added before emulsification. The proportion of glue solution to the water japan may be varied within wide limits. For example, to a water japan made by emulsifying five gallons of japan base in ten gallons of water containing one-half gallon of ammonia of 0.9 specific gravity, there is added about 10 to 20% of glue solution by volume. Other colloids, as, for example, starch, agar or water glass can be similarly used. The colloid, in my opinion, acts as a protective agent by forming a coating over the surface of the droplets of the japan base in the emulsion thus tending to prevent the access of carbon dioxid of the air, which under certain conditions produces scumming of the japan emulsion.

A water japan prepared with the addition of glue is applied to objects to be coated in the usual manner as either by dipping the objects, preferably while hot, into the japan, by electrical cataphoresis, or by painting the emulsion on the objects. The coated objects are then dried in the usual manner.

The addition of the glue improves not only the adhesion of the product but also improves the appearance, durability and flexibility of the finished product.

What I claim as new and desire to secure by Letters Patent of the United States, is,—

1. A composition of matter comprising an emulsion in water of japan-forming material and a non-oleaginous colloid acting to reduce scumming.

2. A water-japan containing a gelatinous colloid.

3. A japan comprising an emulsion in water of asphaltic and oleaginous materials and containing glue.

In witness whereof, I have hereunto set my hand this 10th day of July, 1919.

HARRY CHISLET.